Sept. 18, 1951  E. B. LEWIS  2,567,952
METHOD OF MAKING SPONGE RUBBER
Filed May 21, 1948  2 Sheets-Sheet 1
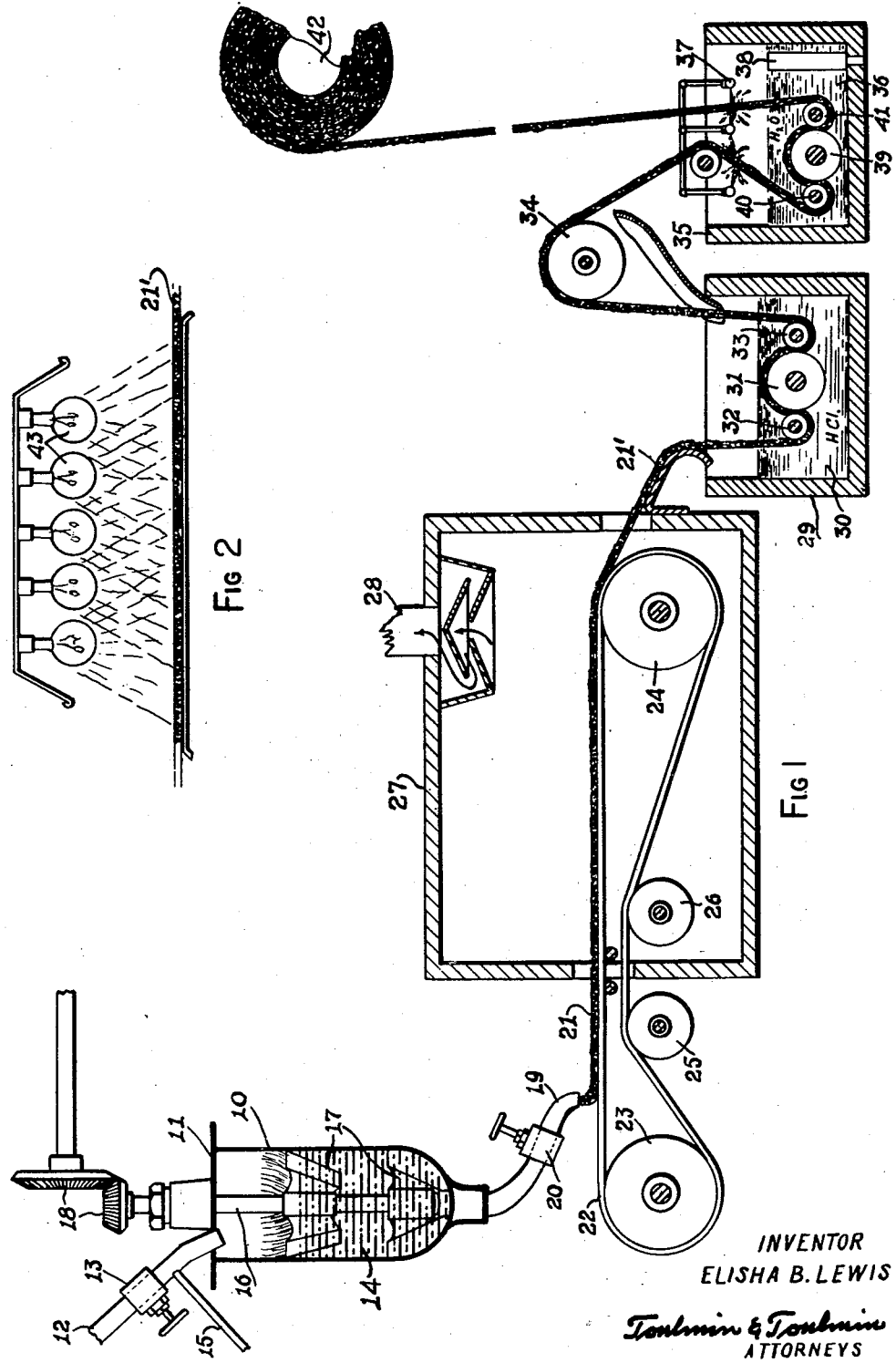
INVENTOR
ELISHA B. LEWIS
Toulmin & Toulmin
ATTORNEYS

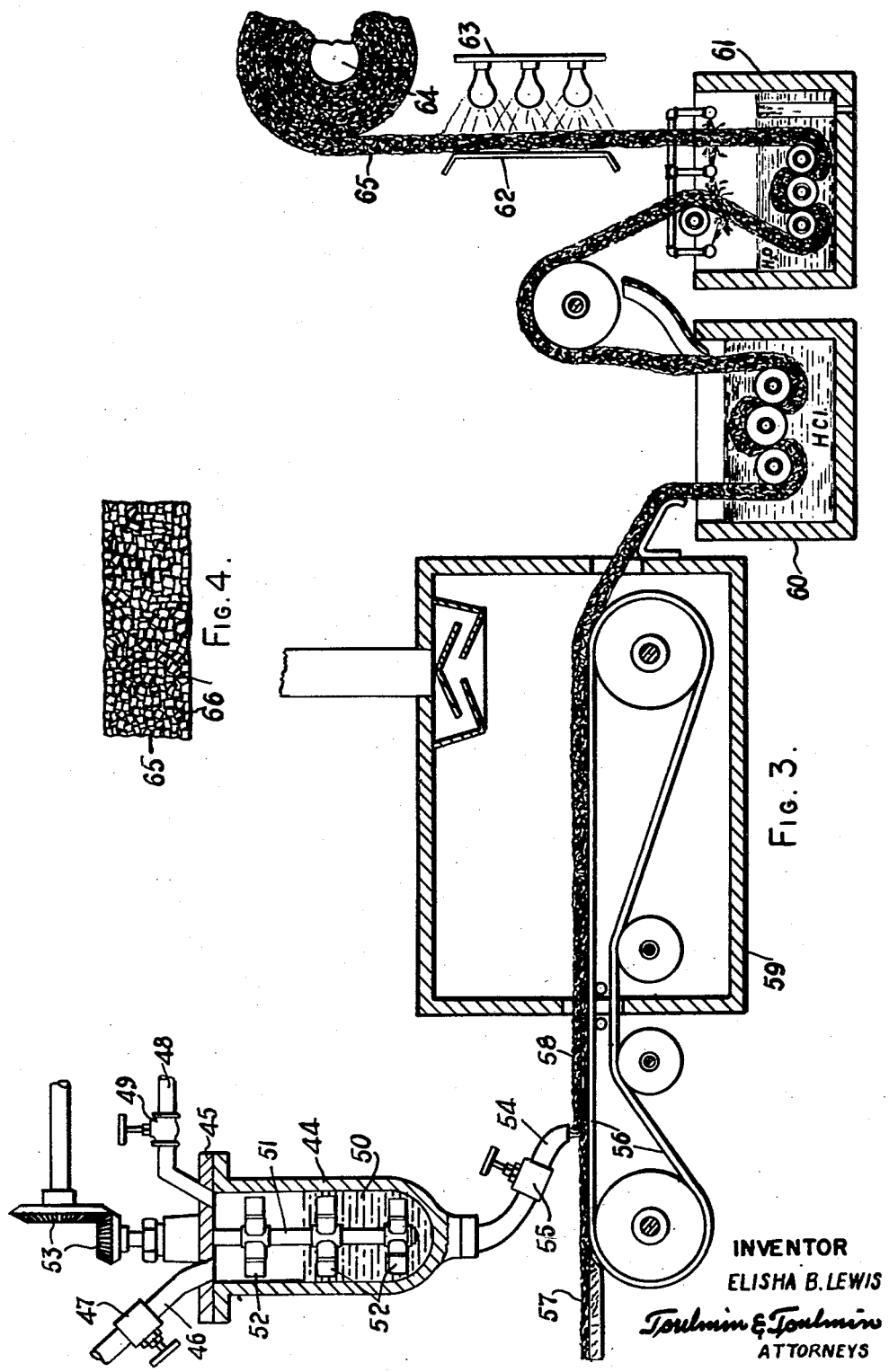

Patented Sept. 18, 1951

2,567,952

UNITED STATES PATENT OFFICE 2,567,952

METHOD OF MAKING SPONGE RUBBER

Elisha B. Lewis, Dayton, Ohio, assignor to The Commonwealth Engineering Company of Ohio, Dayton, Ohio, a corporation of Ohio Application May 21, 1948, Serial No. 28,490

7 Claims. (Cl. 260—2.5)

This application is a continuation-in-part of the application filed in the name of Elisha B. Lewis, Serial No. 13,605, filed March 8, 1948, now abandoned, entitled "Method of Making Sponge Rubber."

This invention deals with a process for manufacturing sponge rubber, and in particular with a process for producing a rubber foam and curing it.

It is an object of this invention to provide sponge rubber which is characterized by an extremely high degree of porosity.

It is an object of this invention to produce a curable rubber foam which is very stable so that during vulcanization the porous structure is not destroyed or impaired.

It is another object of this invention to provide a rubber foam for the production of sponge rubber which does not coagulate prematurely.

It is still another object of this invention to provide sponge rubber which has a fine and uniform texture formed by minute discrete cells.

It is still another object of this invention to provide sponge rubber which is characterized by great strength and resiliency.

It is still another object of this invention to provide a foam rubber which does not decolorize during vulcanization.

It is still another object of this invention to provide a sponge rubber which is non-inflammable.

These and other objects are accomplished by adding a sodium silicate solution to a rubber latex introducing nitrous oxide gas while subjecting this mixture to high-speed agitation whereby a rubber foam is produced, and curing the foam obtained thereby.

While the quantity of sodium silicate may vary within wide ranges, it has been found that incomparably good results are obtained with a proportion of substantially 2.25 per cent by volume of sodium silicate solution with regard to the latex. It has also been found that while nitrous oxide gas may be introduced under pressure, the use of high speed stirring is superior thereto, because a considerably greater increase in volume is obtained thereby and moreover, because substitution of agitation for pressure makes possible simplification of the process as well as of the apparatus for carrying out the process.

All kinds of synthetic and natural latices are satisfactorily operative for the process of my invention; however, it has been found that neoprene latex yields the very best results.

The addition of sodium silicate makes refrigeration of the latices unnecessary, since it acts as protective colloid and curing decelerator and thus prevents coagulation. A quantity of 20 per cent sodium silicate for example, was used prior to this invention in order to dispense with refrigeration; however, it has now been found 2.25 per cent by volume with regard to the latex yield the same favorable effect and in addition thereto have the advantage of producing a still higher volume increase than was obtained with 20 per cent of the agent. This finding was quite unexpected and contrary to logical reasoning.

The sodium silicate solution preferably used has a density of 41° Bé. and a ratio of alkali to silica of 1 to 3.22. The latices are advantageously employed in a concentration of or about 50 per cent.

Sometimes it is advantageous to add a dormant coagulant in order to counteract to a certain degree the effect of the silicate; sodium silicofluoride has been found particularly advantageous for this purpose.

High speed stirring may either be carried out by employing a simple stirrer and moving it up and down during operation so as to cause agitation in all layers or levels of the liquid, or else a so-called compound stirrer, which is one having a plurality of blades or vanes at its axle shaft, may be used. A speed of up to 5,000 R. P. M. has proven suitable.

It has also been found highly satisfactory to combine the high speed agitation with the application of pressure. By this, still a slightly greater volume increase is obtained; however, since the application of pressure complicates the apparatus, it is a question of economy as to whether it is preferable to sacrifice a certain degree of porosity for the advantage of lower cost or whether to produce with the highest efficiency disregarding the cost of production.

After the foam has been prepared, it is cured immediately. Curing, for instance, may be carried out in an oven at an oven temperature of 250° F. for a period of time of 1½ hours. The product is then advantageously cooled, washed with a 1 per cent hydrochloric acid solution for approximately 5 minutes under kneading, and thereafter it is washed with water until neutral. This treatment with hydrochloric acid causes a considerable improvement of the resiliency of the sponge. After the last washing step, a second curing step for about two hours at 250° F. is applied.

Vulcanization under infra-red light has also been found highly satisfactory. For this purpose the rubber foam is preferably deposited on a steel or other metal sheet and then exposed to infra-red light for a time of from 15 to 20 minutes. If a product of considerable thickness, namely of 1" and more, is to be manufactured, it was found advisable to prepare and cure it in installments. This is carried out by first placing a foam layer of, say, ¼" thickness, heating for 15 to 20 minutes, superposing another foam layer of about the same thickness and curing the added layer. These steps are repeated until a product of the desired thickness is obtained. The sponge produced by this stepwise procedure does not show any lines of separation; it is an integral unit and has the same excellent qualities as sponge produced by the one-step process.

I have also obtained favorable results by a combination of infra-red and oven heating. In that case it is preferred first to heat the foam under infra-red light for about 15 minutes and thereafter in an oven for approximately 1 hour at 250° F. If a washing step with hydrochloric acid is inserted between the two heating steps, oven heating was extended to 3 hours.

For the vulcanization with infra-red light, a voltage of 115 volts and 375-watt lamps were used. The distance of the lamps from the rubber surface was approximately 16".

Another very satisfactory modification of carrying out infra-red heating, it has been found, is first to use a voltage of 110 volts for approximately 5 minutes and thereafter 220 volts for another 10 minutes.

In some cases the increase of volume during the foaming step was so great, that the cell walls tended to or did collapse. In order to prevent this failure, the cell walls were strengthened by adding to the latex a solution of high alpha-cellulose, e. g., that sold by Brown Paper Company under the trade name "Solkafloc." From 3 to 5 per cent by volume were found sufficient.

In the following, an example is given of a latex composition which was found particularly advantageous for the production of sponge rubber by the process of my invention. This example, it will be understood, is given merely for the purpose of illustration but not for that of limitation.

*Example*

| | |
|---|---|
| Neoprene latex (50%) cc | 400 |
| Sodium silicate solution (41° Bé.) cc | 9 |
| Plasticizer No. 30—1 (a vegetable oil) cc | 8 |
| Sentisitizer No. 40—2 cc | 9.2 |

The plasticizer and sensitizer used in the above example are those sold by American Anode, Inc., Akron, Ohio, under the numbers quoted above. Plasticizer No. 30—1 is 100% castor oil and Sensitizer No. 40—2 is a 25% dispersion of sodium silico fluoride. The ingredients were added in the order given above under rapid agitation with a compound stirrer. After the plasticizer was added, nitrous oxide was introduced; the mixture was foamed thereby and its volume increased by about 450%. Thereafter the sensitizer dissolved in approximately 50 cc. water was admixed while still continuing the stirring operation. From the foam thus obtained ¼" thick layers were poured into hot glass molds and cured under infra-red light for approximately 15 minutes. After the last batch was added, final curing was carried out in an oven for 1 hour at 250° F. Another sample of the same composition was washed before final curing with 1% HCl, then with water until all acid was removed. This latter sample was then oven-cured at 250° F. for 3 hours. Both products obtained were of a low density, a fine porous structure and high resiliency, the second sample, however, due to the washing step, being superior as to resiliency.

In the accompanying drawings, preferred embodiments of the process and the apparatus used therefor are illustrated. In these drawings, Figure 1 is a diagrammatic sectional view of an apparatus as a whole by which the present process may be carried out;

Figure 2 is a diagrammatic sectional view of a modification of one detail of the apparatus shown in Figure 1;

Figure 3 is a diagrammatic fragmentary sectional view of another embodiment of an apparatus for carrying out the process of my invention; and Figure 4 is an elevational view of a piece of the final product obtained by the process of this invention.

Referring to the drawings in detail, and in particular to Figure 1, 10 represents a container in which rubber foam is produced and 11 a lid to cover the container during operation. A latex supply pipe 12 is arranged in the lid 11 and may be closed by a valve 13. The latex mixture in the container is designated with the reference numeral 14. A pipe 15 terminates in the latex supply pipe 12; it is connected with a source of gas, preferably nitrous oxide (not shown); this gas creates the cells in the rubber latex and converts it into foam. A shaft 16 is rotatably mounted in the container 10; it is provided with vanes 17 and driven by a motor (not shown) via gears 18. At the bottom of the container an outlet pipe 19 is arranged which may be shut off by a valve 20. The rubber foam dispensed from the outlet 19 is indicated by the reference numeral 21; it is deposited on an endless belt 22 which is continuously driven by the driving rolls 23 and 24. The belt is also supported by two guide rolls 25 and 26. Adjacent to the foaming container there is arranged a curing oven 27 through which the foam layer 21 is guided on the belt 22 in order to cure the foam and convert it into rubber sponge. The oven 27 is provided with a flue 28. The rubber sponge 21' which leaves the oven 27 is then led through a bath container 29 which is filled with diluted hydrochloric acid 30. The sponge material guided over roll 31, is subjected to pressure by the squeeze rolls 32 and 33 whereby a thorough penetration of the sponge by the hydrochloric acid is obtained. Thereafter the sponge is led over guide roll 34 into a water bath 35 filled with water 36 derived from a spray system 37. An overflow drain pipe 38 is arranged at the bottom of this bath container. Also in this bath, squeezing is carried out on that part of the rubber sponge which is located on a guide roll 39 by means of two pressure rolls 40 and 41. The sponge leaving the water bath, in the instant illustrated in the form of a ribbon, is allowed to air-dry; it is then wound onto a reel 42.

Figure 2 illustrates a modified curing device. There the sponge rubber 21' is exposed to heat derived from a set of infra-red lamps 43.

Figure 3 illustrates a modified apparatus for carrying out the process of the invention. In this instance foaming is effected under pressure. For this purpose latex 50 is introduced into an autoclave 44 by means of a supply pipe 46 provided with a valve 47. This supply pipe is arranged in a lid 45 which warrants hermetical closure of the container. A pipe 48 is also mounted in the lid for the purpose of introducing gas under pressure; it is provided with a valve 49. A stirring equipment consisting of a shaft 51 and a plurality of blades 52 is arranged in the autoclave; it is driven by a motor via speed control gears 53. The foamed latex is dispensed from an outlet pipe 54 which is equipped with a valve 55.

As in the instance of Figure 1, an endless belt 56 receives the rubber foam continuously. In the instance illustrated a sponge rubber layer 57 has already been formed in a previous step and by a similar equipment as the one shown in the drawing. The spout 54 deposits a second layer of rubber foam 58 onto said previous layer 57. These two layers, when travelling on the belt 56, are guided through a curing oven 59; in this step, the two layers are integrally united, and the product leaving the oven is free from any separation line. As in the modification illustrated in Figure 1, the sponge rubber is then guided through a bath of hydrochloric acid 60 and a water bath 61. In contradistinction to the process of Figure 1, in the instant case the rubber foam is not air dried but subjected to infra-red heat. For this purpose the rubber sponge is carried over a support 62 above which a set of infra-red lamps 63 is arranged. Finally, the end product is wound on a reel 64.

Figure 4 shows the final product 65 on an enlarged scale. The discrete cells formed by the nitrous oxide gas are designated with 66.

The prime advantage obtained by the process of my invention is that a flame-resistant product is produced. The sponge is of very fine and uniform texture, and there are no channels which extend throughout the entire thickness of the material. The rubber shows a high resiliency and has a long service life.

It will be understood that all kinds of rubber latices, natural or synthetic, are operative for the invention. In addition to neoprene, polyvinyl chloride, butadiene and vinylidene latices have been found particularly advantageous.

It will also be understood that the latex compositions used for the process of my invention may contain other additional ingredients than those mentioned in the example given. For instance, latices containing accelerators, vulcanizing agents, albumen, proteins and other auxiliary materials customary and well known to those skilled in the art are within the scope of my invention. Likewise, the compositions of the latex and the curing conditions may be chosen so as to obtain a final product of the desired degree of hardness. It will be understood that the process of my invention set forth herein lends itself to the manufacture of a soft as well as to that of a hard rubber sponge.

It will be understood that while there have been disclosed herein certain specific embodiments of my invention it is not intended thereby to have the invention limited to the details given in view of the fact that it is susceptible to various modifications and changes which come within the spirit of the disclosure and the scope of the appended claims.

I claim:

1. In a process for manufacturing sponge rubber, the steps of (a) mixing a rubber latex having a concentration of approximately 50 percent with approximately 2.25 per cent by volume of a sodium silicate solution of 41° Bé. and a ratio of alkali to silica of 1 to 3.22, (b) introducing nitrous oxide gas under pressure while subjecting the mixture to high-speed agitation of up to 5,000 R. P. M. whereby a rubber foam is produced, and (c) curing said foam.

2. In a process for manufacturing sponge rubber, the steps of (a) mixing a rubber latex having a concentration approximately 50 percent with approximately 2.25 per cent by volume of a sodium silicate solution of 41° Bé. and a ratio of alkali to silica of 1 to 3.22, (b) introducing nitrous oxide gas while subjecting the mixture to high-speed agitation whereby a rubber foam is produced, (c) curing said foam, (d) washing the product obtained with diluted hydrochloric acid, (e) removing said acid, and (f) completing the vulcanization.

3. In a process for manufacturing sponge rubber, the steps of (a) mixing a rubber latex having a concentration of approximately 50 percent with approximately 2.25 per cent by volume of a sodium silicate solution of 41° Bé. and a ratio of alkali to silica of 1 to 3.22, (b) introducing nitrous oxide gas while subjecting the mixture to high-speed agitation whereby a rubber foam is produced, (c) curing said foam at 250° F. for 1½ hours, (d) washing the product obtained with diluted hydrochloric acid, (e) removing said acid, and (f) completing the vulcanization by heating at 250° F. for substantially 2 hours.

4. In a process for manufacturing sponge rubber, the steps of (a) mixing a rubber latex having a concentration of approximately 50 percent with approximately 2.25 percent by volume of a sodium silicate solution of 41° Bé. and a ratio of alkali to silica of 1 to 3.22, (b) introducing nitrous oxide gas while subjecting the mixture to high-speed agitation whereby a rubber foam is produced, (c) curing said foam with infra-red light, (d) washing the product obtained with diluted hydrochloric acid, (e) removing said acid, and (f) completing the vulcanization by exposing said sponge rubber to infra-red light.

5. In a process for manufacturing sponge rubber, the steps of (a) mixing a rubber latex having a concentration of approximately 50 percent with approximately 2.25 per cent by volume of a sodium silicate solution of 41° Bé. and a ratio of alkali to silica of 1 to 3.22, (b) introducing nitrous oxide gas while subjecting the mixture to high-speed agitation whereby a rubber foam is produced, (c) curing said foam with infra-red light for 15 to 20 minutes, (d) washing the product obtained with diluted hydrochloric acid, (e) removing said acid, and (f) completing the vulcanization by exposing said sponge rubber to infra-red light for 15 to 20 minutes.

6. In a process for manufacturing sponge rubber, the steps of (a) mixing a rubber latex having a concentration of approximately 50 per cent with approximately 2.25 per cent by volume of a sodium silicate solution of 41° Bé. and a ratio of alkali to silica of 1 to 3.22, (b) introducing nitrous oxide gas while subjecting the mixture to high-speed agitation whereby a rubber foam is produced, and (c) curing said foam by exposing it to infra-red light for approximately 15 minutes and thereafter heating it in an oven for 1 hour at 250° F.

7. In a process for manufacturing sponge rubber, the steps of (a) mixing a rubber latex having a concentration of approximately 50 per cent with approximately 2.25 per cent by volume of a sodium silicate solution of 41° Bé. and a ratio of alkali to silica of 1 to 3.22, (b) introducing nitrous oxide gas while subjecting the mixture to high-speed agitation whereby a rubber foam is produced, (c) curing said foam with infra-red light for 15 minutes, (d) washing the product obtained with 1 per cent hydrochloric acid, (e) removing said acid from said product by washing with water, and (f) completing the vulcanization by heating in an oven for 3 hours at 250° F.

ELISHA B. LEWIS.

REFERENCES CITED

The following references are of record in the file of this patent:

UNITED STATES PATENTS

| Number | Name | Date |
| --- | --- | --- |
| 1,659,371 | Merrill | Feb. 14, 1928 |
| 2,181,299 | Burgess | Nov. 28, 1939 |
| 2,288,190 | Harrison | June 30, 1942 |
| 2,290,622 | Carter | July 21, 1942 |
| 2,321,111 | Stamberger | June 8, 1943 |
| 2,444,546 | Walsh | July 6, 1948 |